Nov. 17, 1970   R. L. BENNETT   3,541,322
SUPPORTS FOR LIGHT ARRANGEMENTS AND THE LIKE
Filed March 3, 1969   10 Sheets-Sheet 2

INVENTOR
ROY L. BENNETT
his attorneys

Nov. 17, 1970     R. L. BENNETT     3,541,322
SUPPORTS FOR LIGHT ARRANGEMENTS AND THE LIKE
Filed March 3, 1969     10 Sheets-Sheet 1

INVENTOR
ROY L. BENNETT

Nov. 17, 1970      R. L. BENNETT      3,541,322
SUPPORTS FOR LIGHT ARRANGEMENTS AND THE LIKE
Filed March 3, 1969      10 Sheets-Sheet 3
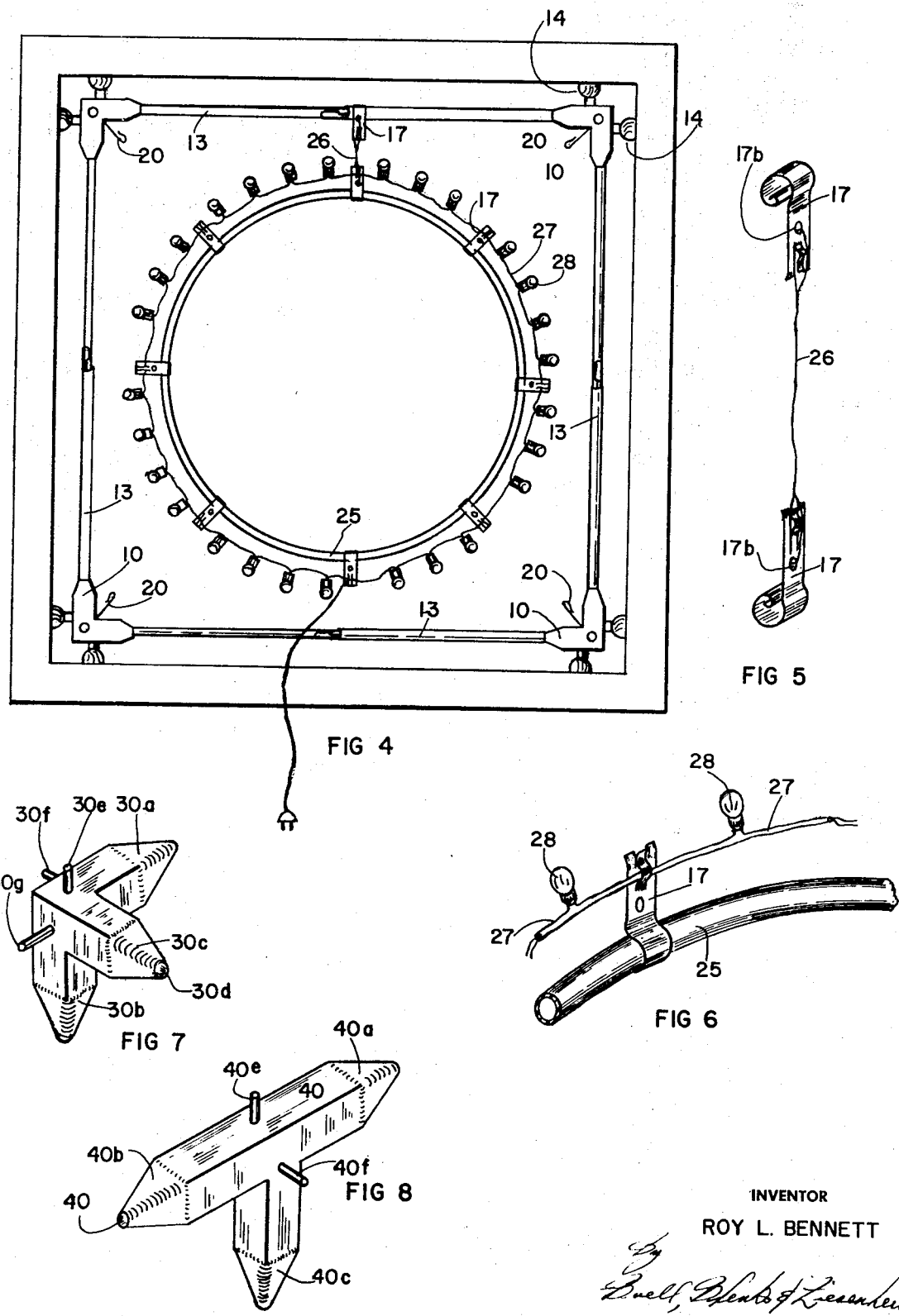
INVENTOR
ROY L. BENNETT Nov. 17, 1970     R. L. BENNETT     3,541,322
SUPPORTS FOR LIGHT ARRANGEMENTS AND THE LIKE
Filed March 3, 1969     10 Sheets-Sheet 4

INVENTOR
ROY L. BENNETT

Nov. 17, 1970  R. L. BENNETT  3,541,322
SUPPORTS FOR LIGHT ARRANGEMENTS AND THE LIKE
Filed March 3, 1969  10 Sheets-Sheet 5

INVENTOR
ROY L. BENNETT

Nov. 17, 1970  R. L. BENNETT  3,541,322
SUPPORTS FOR LIGHT ARRANGEMENTS AND THE LIKE
Filed March 3, 1969  10 Sheets-Sheet 6

INVENTOR
ROY L. BENNETT

Nov. 17, 1970 R. L. BENNETT 3,541,322
SUPPORTS FOR LIGHT ARRANGEMENTS AND THE LIKE
Filed March 5, 1969 10 Sheets-Sheet 8

INVENTOR
ROY L. BENNETT

United States Patent Office 3,541,322
Patented Nov. 17, 1970

3,541,322
SUPPORTS FOR LIGHT ARRANGEMENTS AND THE LIKE
Roy L. Bennett, 920 Cresswell St., Pittsburgh, Pa. 15210
Continuation-in-part of application Ser. No. 642,378, May 31, 1967. This application Mar. 3, 1969, Ser. No. 803,811
Int. Cl. F21p 1/02
U.S. Cl. 240—10          9 Claims

ABSTRACT OF THE DISCLOSURE

A support is provided for light arrangements, tub enclosures, partition panels and the like made up of a plurality of resilient corner members, each having at least two openings at right angles to one another, a plurality of telescoping side member frictionally engaged in said openings in the corner members and defining a desired support structure, a friction clamping member slidable on the telescoping members to hold them against telescoping movement in their final position and removable clip means engaging said telescoping members and a part to be supported.

---

This application is a continuation-in-part of my co-pending application Ser. No. 642,378 filed May 31, 1967, now abandoned.

This application relates to supports for light arrangements and like structures and particularly to a support structure which has broad usefulness in areas of support for light arrangements, supports for wall and ceiling panels, supports for sliding door stracks, tub enclosures and drying racks.

There has long been a need for a simple support structure of universal applicability which would be inexpensive, yet completely flexible. For example in the area of Christmas light arrangers, there have been proposed various ways to support strings of electrical lights in decorative patterns in a window, around a doorway or in some other geometric pattern. Such devices as have been available have been relatively complex and limited in their usefulness. The patent to Esch No. 3,025,389 is typical of prior art structures. In the Esch patent vertical posts are provided at their ends with resilient pads adapted to bear on the top and bottom members of an opening. The vertical members are made up of two telescoping parts with a spring between them urging them apart so as to apply pressure on the resilient pads to hold the vertical members in place. Horizontal members of fixed length are connected to the vertical members adjacent top and bottom and lights are attached to the vertical and horizontal members by clips. This structure has very limited utility. It can be used only within a confining opening. It can have only very limited adjustability because of the fact that it is dependent upon spring loading to hold it and the horizontal members are of fixed length. Finally it cannot have a free standing form.

The present invention on the other hand has very broad utility and can be used in a variety of ways. As a Christmas light arranger the present invention makes it possible to eliminate the use of nails, tacks, tape, string and other make-shift devices that people often resort to in placing Christmas lights in windows as the support of this invention fits any size window simply by extending or contracting adjustable or telescopic rods that are supported in the form of a rectangle by four rubber corners. Clamps and locks help to hold the rods in a stable position. Hooks made of thin wire, can be placed into the rubber corner enabling one to achieve different designs with their Christmas lights. For example, an X can be made by attaching a string of lights to the hooks placed in the rubber corners and running the lights diagonally from these hooks. A hexagon can be made by attaching the Christmas lights to two clamps both at the top and bottom of the rods of the support of this invention and to one clamp attached to each side of the support.

This support can be used in larged showcase windows for display purposes by making use of rubber suction cups that are attached both to the front side and top side of each rubber corner. Glue may be applied to the suction cups where necessary to hold the support in place against the window frames. The support of this invention can be used in bars and restaurants and can also be made to stand on tables by employing a vise that can be attached to any surface. The vise itself is made so that two supporting rods can be attached on the vise and extended to the desired location on the telescopic rods of the support of this invention where they form a right angle with a rod running horizontal to the floor, further stablizing the support.

This support can be made into a religious cross by using the rubber corners without the suction cups, smaller adjustable-telescopic rods, hooks and clamps. By placing hooks either on the outside or inside of the rubber corners and by adjusting the clamps on the outside or inside of the rods, the Christmas lights could accordingly be placed on the outside or inside of the religious cross.

The support of this invention can be used as the framework for a tub enclosure by fastening channels on the horizontal arms of the support and inserting glass or plastic panels in the channels either in fixed or sliding relationship.

Similarly the support may be used to carry wall panels by attaching top and bottom channels and inserting preformed wood, plywood, pressed wood or gypsum type building panels in said channels.

Preferably I provide a support having a plurality of resilient corner members each having at least tyo openings at right angles to one another, a plurality of telescoping side members engaged in said openings in the corner members and defining the desired support structure, a friction clamping member slidable on the smaller member of each telescoping side member and frictionally engageable between the parts of each telescoping side member to hold them in a selected fixed position and removable clip means engaging said telescoping members and a part to be supported. Preferably the corner members are made of rubber having holes which resiliently grip the telescoping side members. The telescoping side members are preferably made of metal such as aluminum and in two pieces, one slidable within the other.

In the foregoing general description of my invention I have set out certain objects, purposes and advantages Other objects, purposes and advantages will be apparent from a consideration of the following description and the accompanying drawings in which:

FIG. 4 is an elevational view of a support as in FIG. 1 with a different light arrangement;

FIG. 5 is an enlarged elevational view of the light hanger arrangement of FIG. 4;

FIG. 6 is an enlarged fragmentary view of the light holding structure of FIG. 4;

FIG. 7 is an isometric view of a three way corner member according to my invention;

FIG. 8 is an isometric view of a three way in line corner member according to my invention;

Figure 1:
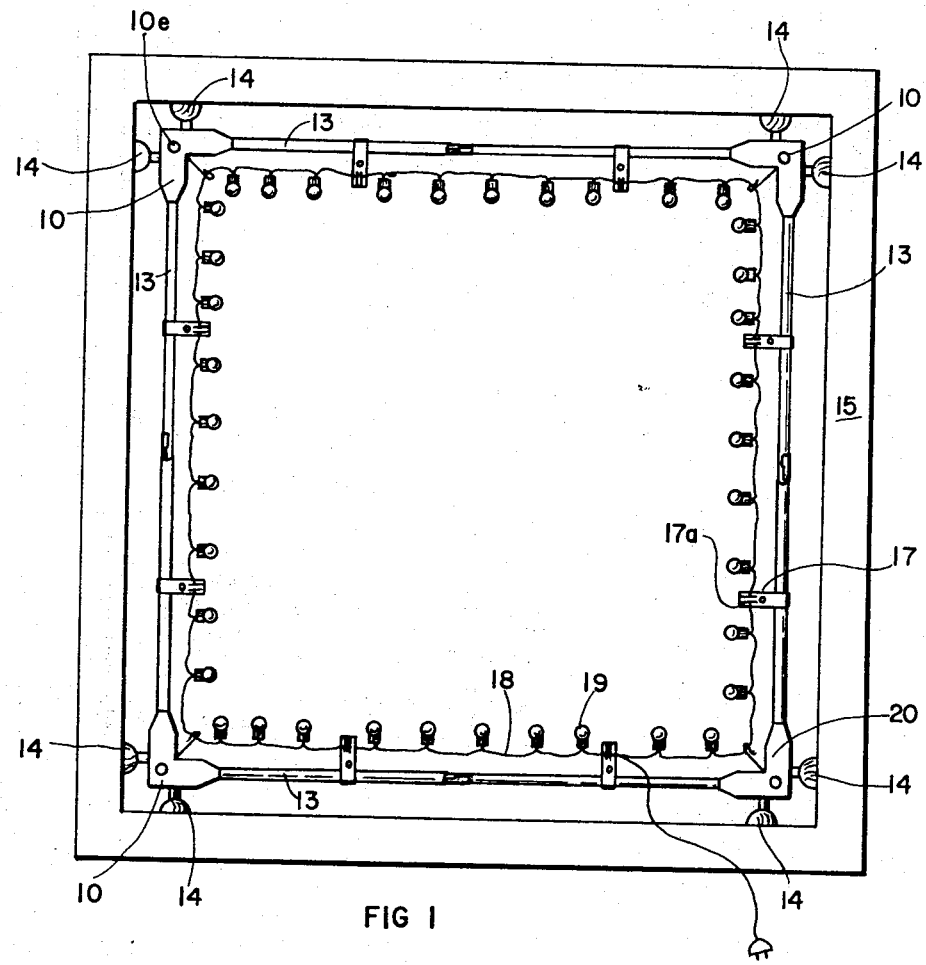
FIG. 1 is an elevational view of a support according to this invention used as a light arranger in a window.

Referring to the drawings and particularly to FIG. 1, I have illustrated a Christmas light arranger according to my invention which is made up of rubber right angled corner members 10 having openings 11 and 12 at the end of each arm 10a and 10b adapted to frictionally engage a telescoping rod member 13. Each corner member 10 is provided with outwardly projecting studs 10c, 10d and 10e adapted to frictionally receive suction cups 14 which hold the corner members in place in a window frame 15 for example. Each of the telescoping rod members 13 is made up of an outer hollow member 13a and an inner sliding member 13b. A lock 16 engages the inner member 13b between a pair of spring arms 16a. A tab 16b on the lock slides along the outer wall of inner member 13b into the end of outer telescoping member 13a to prevent the two members 13a and 13b from moving relatively to one another. A series of spaced clamps 17 engages the telescoping members 13 at spaced points along the length of the telescoping members 13. Each clamp 17 is provided with a spring clip 17a receiving the wire 18 carrying lights 19 to be arranged. A hook member 20 having a sharpened end is insertible into rubber corner members 10 to hold the wire 18 so as to form square corners.

Figure 3:
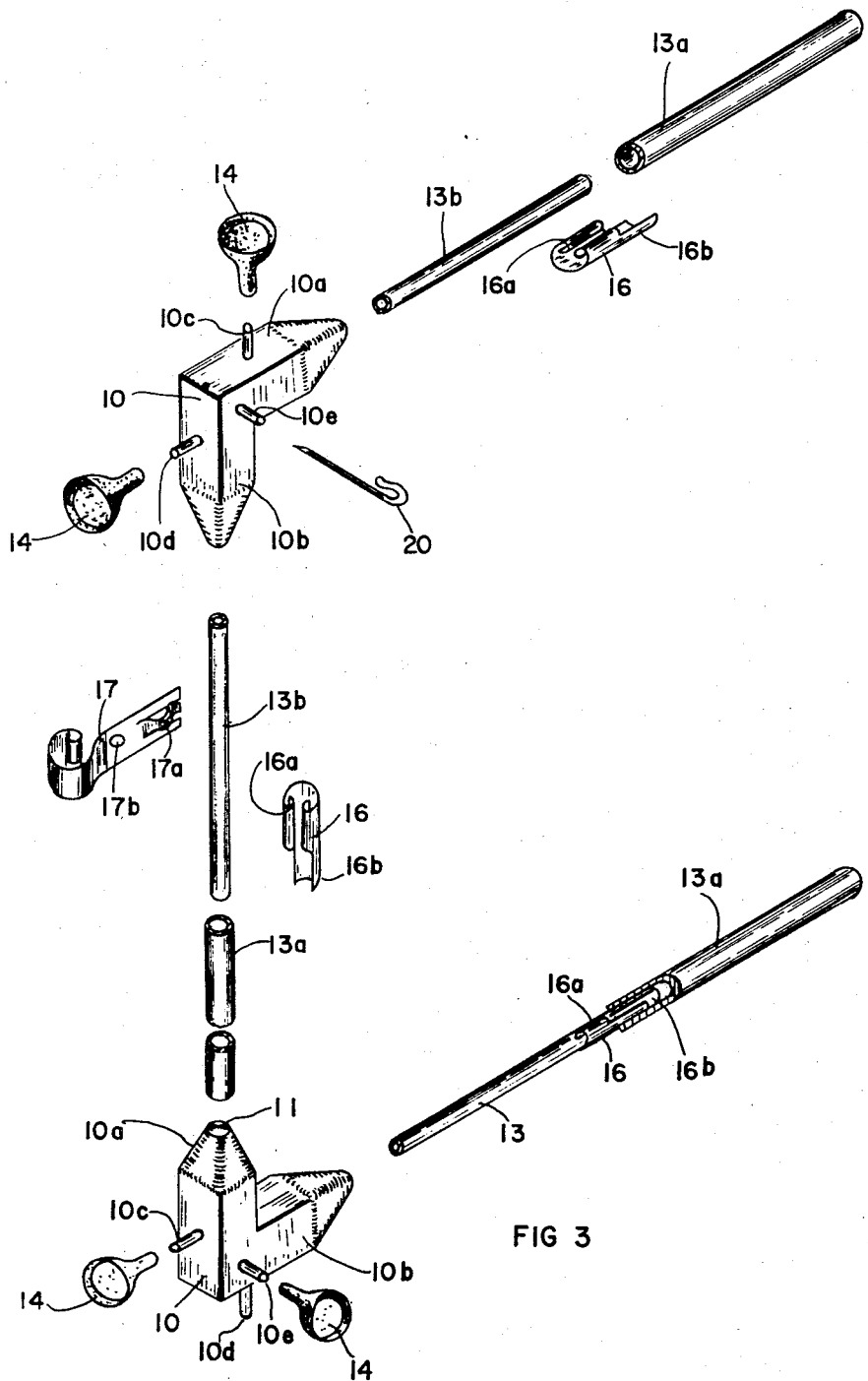
FIG. 3 is an exploded fragmentary view of the structure of the arranger shown in FIG. 1.
Figure 2:
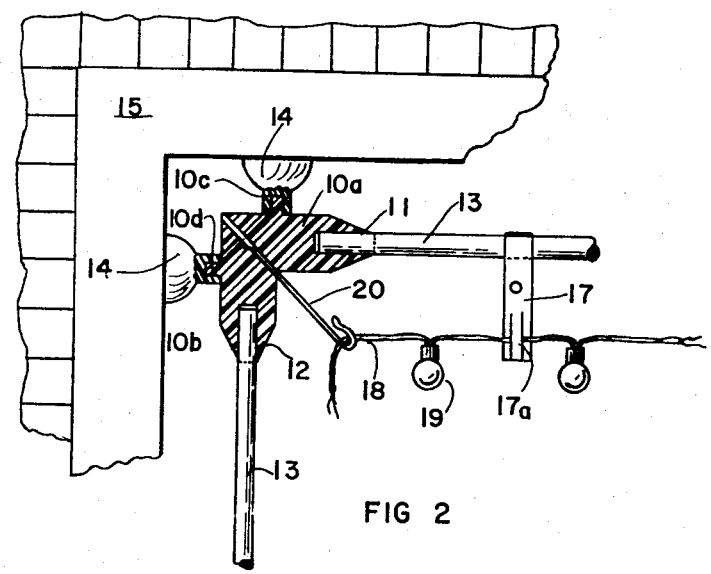
FIG. 2 is an enlarged fragmentary view, partly in section of a corner of the support shown in FIG. 1.

In FIGS. 4, 5 and 6 I have illustrated the same arrangement of corner members 10 and telescoping members 13 held in a window opening 15 by suction cups 14 as in FIGS. 1–3. However I have shown a different light arrangement and method of carrying the same using clips 17. In this arrangement a circular tubular member 25 is suspended from telescoping member 13 by means of two clips 17 held together by a wire 26 passing through openings 17b in clips 17. A wire 27 with lights 28 surrounds tubular member 25 and is held in position by spaced clips 17.

In FIG. 7 I have illustrated a form of resilient corner member 30 having three arms 30a, 30b and 30c at right angles to form a three directional corner. Each arm is provided with an opening 30d frictionally receiving a telescoping member 13. The corner member 30 is also provided with studs 30e, 30f and 30g adapted to receive suction cups 14 as in the case of studs 10c, 10d and 10e of FIGS. 1–3.

In FIG. 8 I have illustrated a corner member 40 adapted to connect two telescoping members in a straight line with a depending member. Member 40 has three arms, two of which 40a and 40b are in a straight line and the third 40c normal thereto. Each arm has an opening 40d adapted to receive a telescoping member 13. Studs 40e and 40f are provided to receive fastening suction cups.

Figure 9:
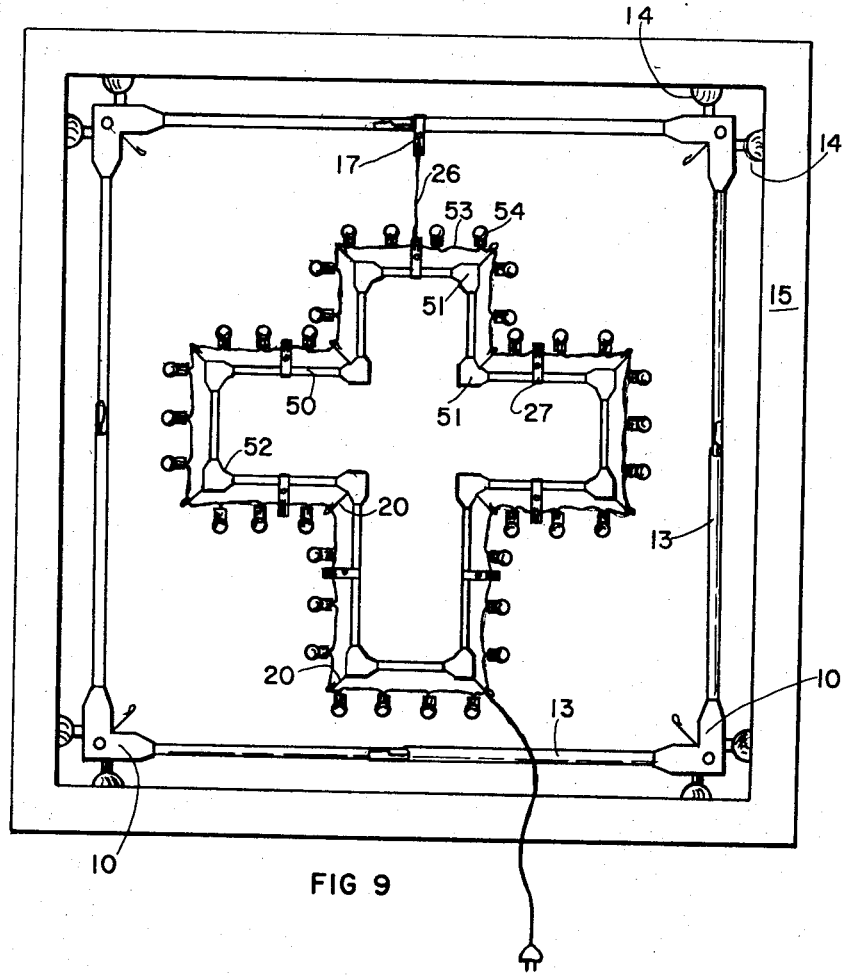
FIG. 9 is a third elevational form of light arrangement using the support of my invention.

FIG. 9 shows another modification of Christmas light arrangers based upon my invention. In this modification the same support as used in FIGS. 1–3 is inserted in a window opening 15. A cruciform frame is made up of rod members 50 joined by corner members 51 of the same shape and character as corner members 10 but of smaller size. Each of the corner members 51 has an opening 52 in the end of each arm receiving a rod member 50. An electrical wire 53 carrying lights 54 is attached around the rod member 50 by clips 17 in the same manner as in FIGS. 1–3. Hooks 20 are inserted in the corner members to provide support for the wire and to insure square corners. The cruciform frame is suspended by clips 17 and wire connector 26 precisely as in FIGS. 4–6.

Figure 10:
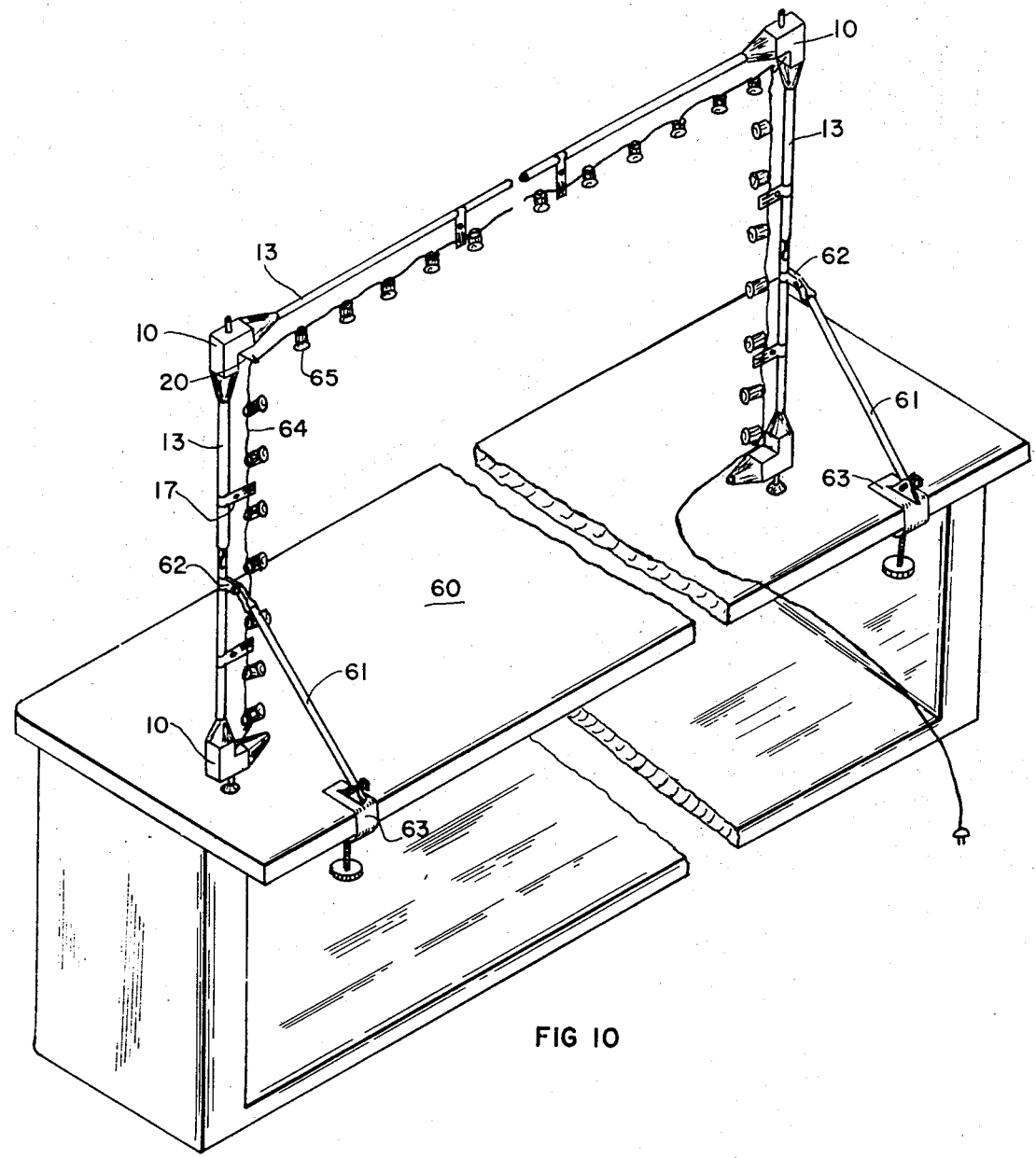
FIG. 10 is an isometric view of a sales counter and the support of my invention used to define a sales frame above the counter.
Figure 11:
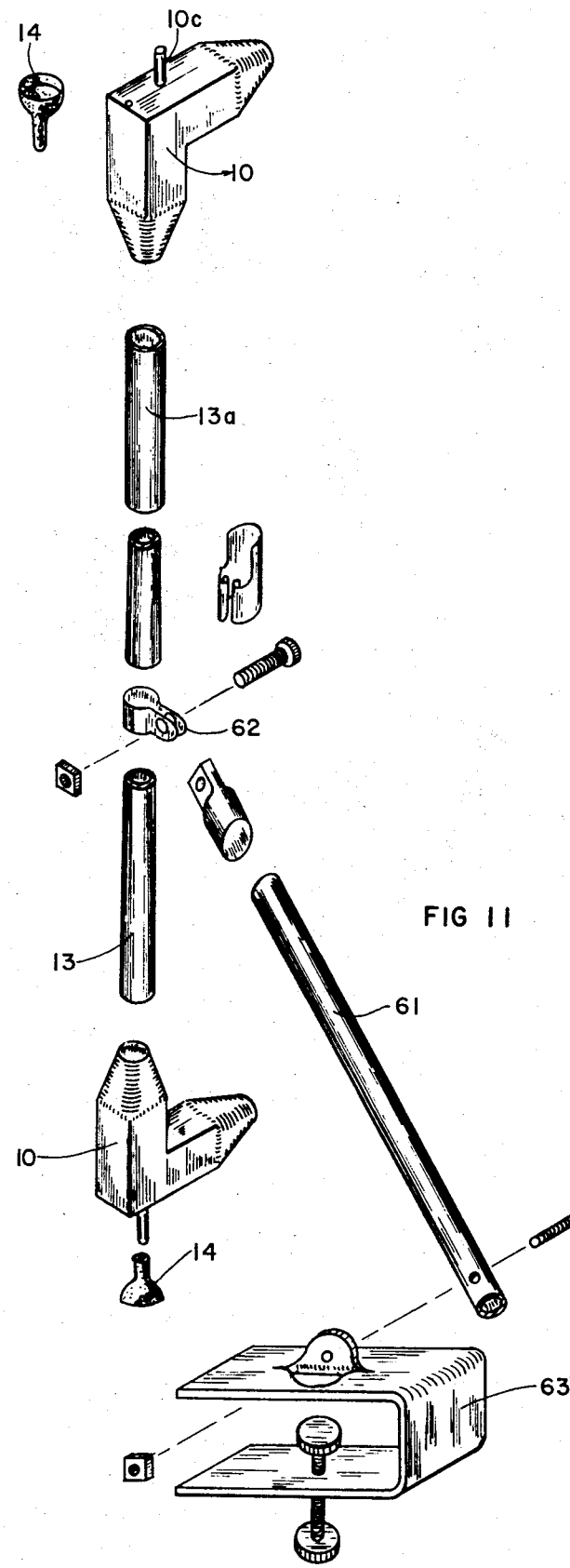
FIG. 11 is an exploded fragmentary view of the vertical support member of FIG. 10.

FIGS. 10 and 11 show a modification of my invention particularly adapted for lighting and outlining a counter space. In this embodiment two corner members 10 are attached to a counter top 60 by suction cups 14 and are connected to two spaced corner members 10 by vertical telescoping rods 13. A single horizontal telescoping rod 13 connects the two top corner members. An angle brace 61 is fixed to each of the vertical rods 13 by a clamp 62 and to the table top by a screw clamp 63. An electrical wire 64 and bulbs 65 are attached to the telescoping rods 13 by spaced clips 17 and to the corner members by hooks 20 as in FIGS. 1–3.

Figure 12:
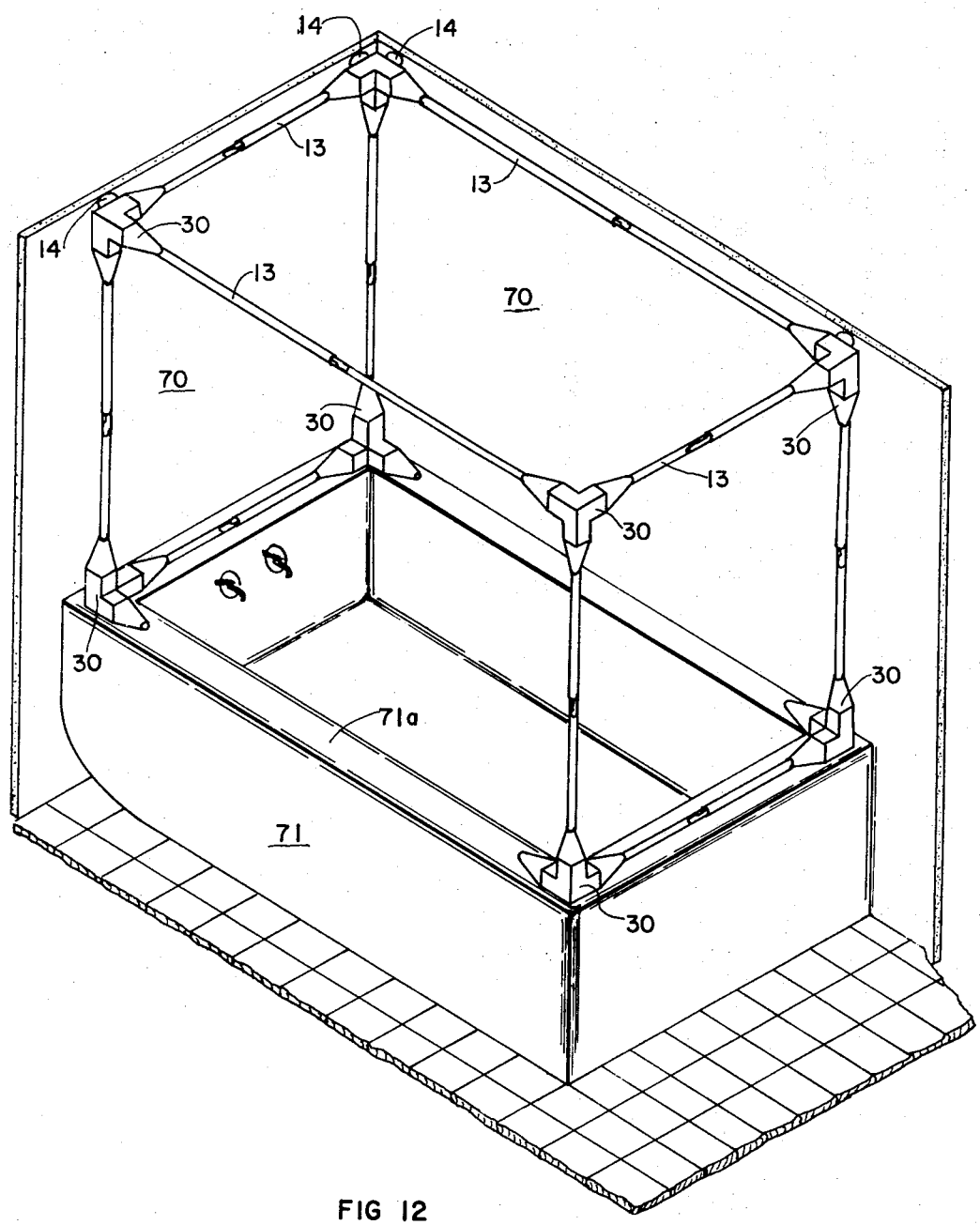
FIG. 12 is an isometric view of the support of this invention used as a tub enclosure for curtains.

FIG. 12 illustrates the use of my invention as a tub enclosure. In this embodiment three directional corner members 30 as more specifically illustrated in FIG. 7 of the drawings are connected together by telescoping rods 13 to define the tub enclosure. The corner members 30 are held in place against the bathroom wall 70 surrounding a tub 71 by suction cups 14 with the enclosure resting on the top wall 71a of the tub. This enclosure may be used to support a curtain or a rigid plastic sheet enclosure.

Figure 13:
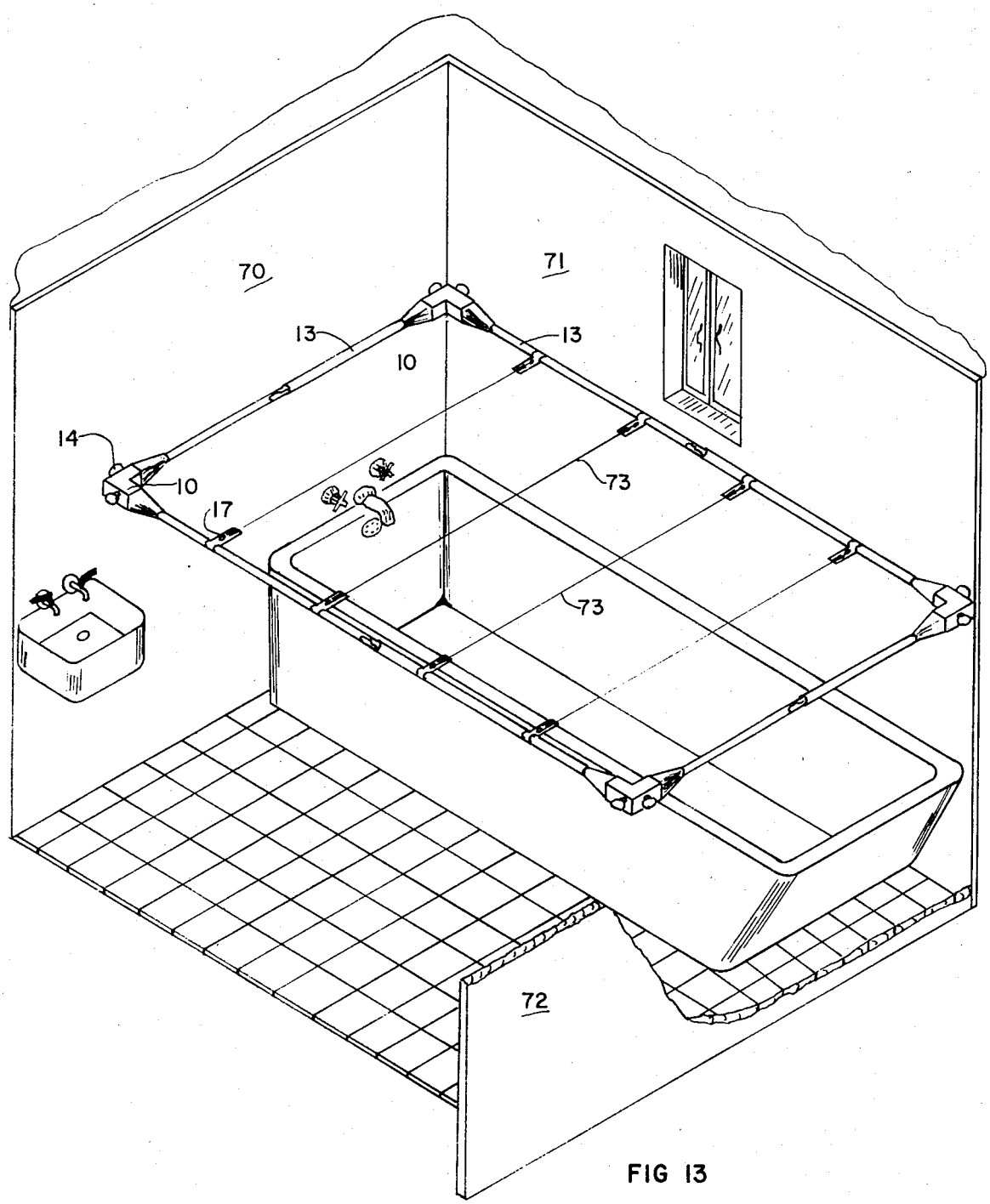
FIG. 13 is an isometric view of the support of my invention used as a clothes hanging and drying structure in a bathroom.

In FIG. 13 I have illustrated the support of my invention used as a clothes line support in a bathroom for hanging women's stockings, lingerie and the like. In this form corner members 10 as in FIGS. 1–3 and telescoping rod members 13 are connected together and held in place by suction cups 14 engaging three sidewalls 70, 71 and 72 of the bathroom. The clothes lines 73 are attached to rod members 13 by clips 17, shown in detail in FIG. 3.

Figure 14:
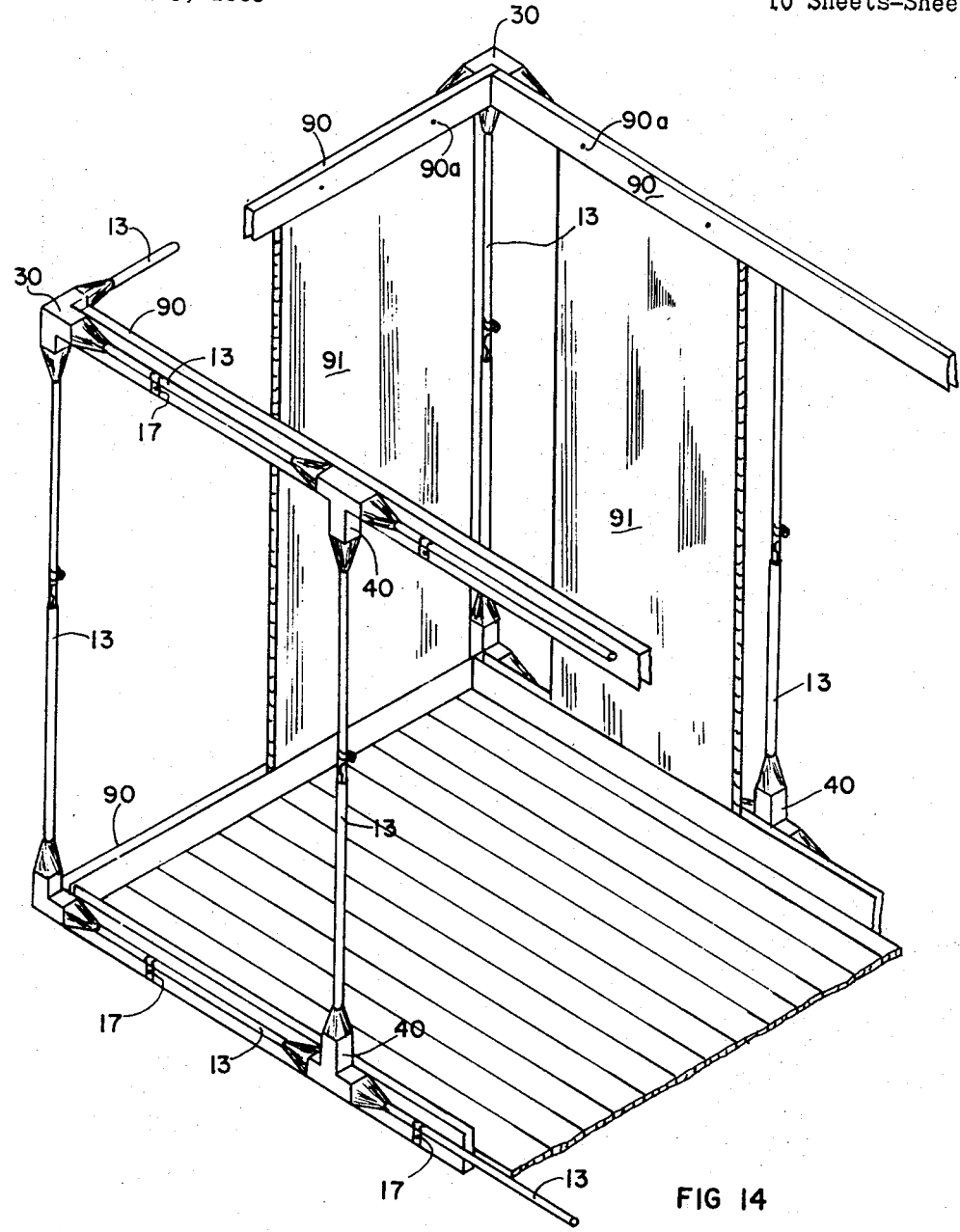
FIG. 14 is a fragmentary isometric view of a support according to my invention used as a support for wall panels to define an enclosed room area.
Figure 15:
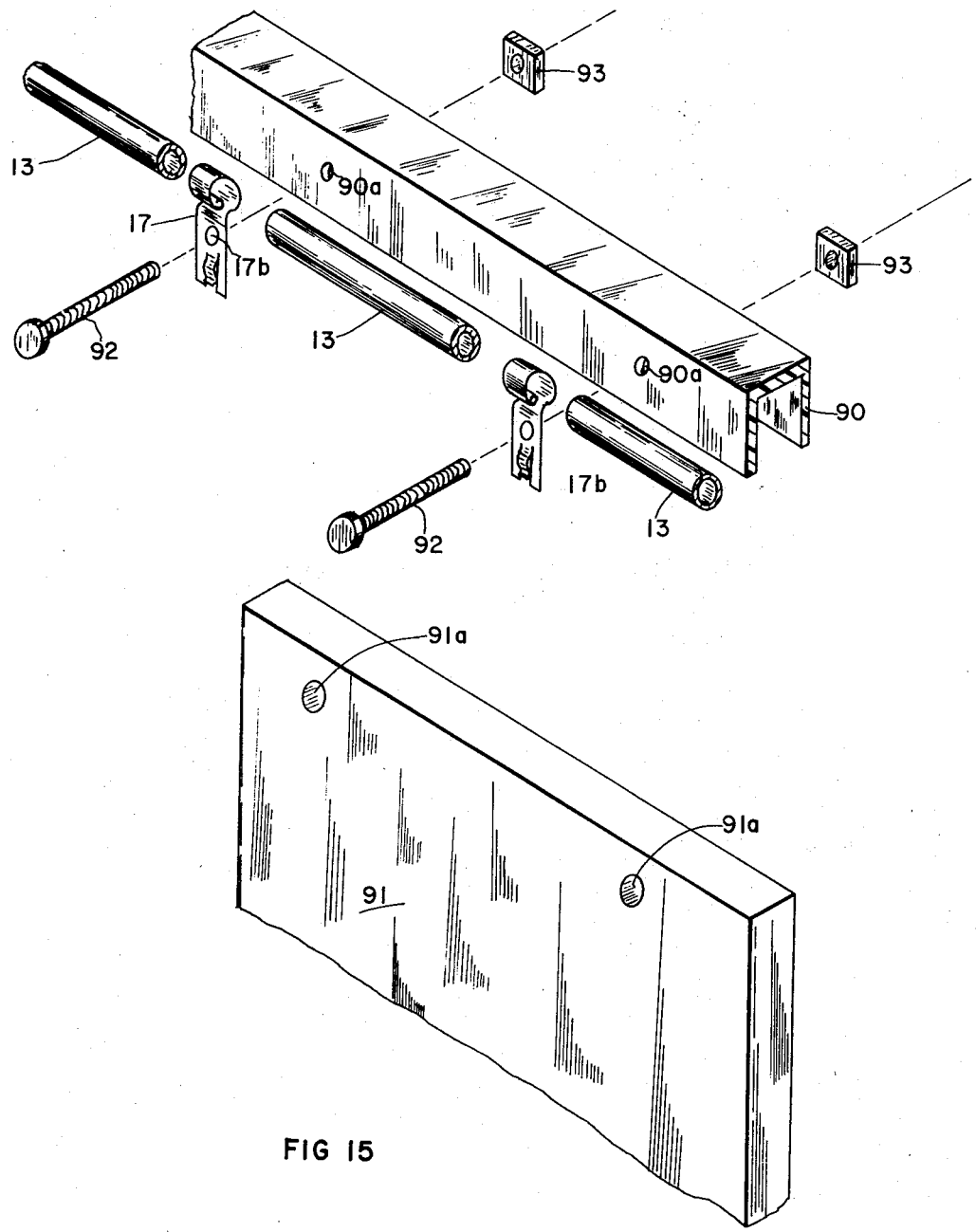
FIG. 15 is an exploded fragmentary view of a horizontal support member and attaching means for the panels of FIG. 14.

In FIGS. 14 and 15 I have illustrated my support used as a room divider or partition carrier. In this form of my invention a framework is made by assembling three directional corner members 30 of FIG. 7 and straight through corner members 40 of FIG. 8 together with telescoping rod members 13. Channel members 90 are attached to the horizontally extending telescoping rod members 13 at spaced intervals and panels 91 of plywood, gypsum board or any of the well known dry wall materials are slid into the channel members to form the partition. The channel members are attached by passing bolts 92 through openings 17b in clips 17 and through openings 90a in channels 90. Preferably bolts 92 are also passed through openings 91a in panels 90, however this is optional. Threaded nuts 93 are placed on bolts 92 to hold them firmly in position.

From the many modifications of my support member described and illustrated above it will be obvious that this invention has broad utility and can be used in many ways to solve, by simple and inexpensive means, problems which have remained unsolved for many years.

I claim:

1. A support for light arrangements, wall panels and the like comprising a plurality of resilient corner members, each having at least two openings at right angles to one another, a plurality of telescoping side members frictionally engaged in said openings in the corner members and defining a desired support structure, a friction clamping member slidable on each of the telescoping members and selectively frictionally engaging the same to hold them against telescoping movement in their final position and removable clip means engaging said telescoping members and a part to be supported.

2. A support as claimed in claim 1 wherein the corner members are made of rubber.

3. A support as claimed in claim 1 wherein the telescoping side members are made up of a smaller diameter rod slidable within a larger diameter hollow rod and the friction clamping member surrounds a part of and frictionally engages the smaller member with a radial abutment portion and enters into the larger member around the smaller member until the abutment portion engages the end of the larger member.

4. A support as claimed in claim 1 wherein the removable clip means are provided with openings and spring fasteners for attachment to an object to be supported.

5. A support for light arrangements, wall panels and the like comprising a plurality of resilient corner members, each having at least two openings at right angles to one another, a plurality of telescoping side members frictionally engaged in said openings in the corner members and defining a desired support structure, a friction clamping member slidable on the telescoping members to hold them against telescoping movement in their final position, removable clip means engaging said telescoping members and a part to be supported, and horizontally extending channel members fastened to the clip means for receiving a partition member.

6. A support as claimed in claim 1 wherein a wire carrying lights is attached to the clip means defining a lighted configuration.

7. A support as claimed in claim 1 wherein a circular member is fastened to said removable clip means within the support, said circular member carrying an electrical circuit and lamps defining a circular light arrangement.

8. A support as claimed in claim 1 wherein a cruciform member is fastened to said removable clip means within the support, said cruciform member carrying an electrical circuit and lamps defining a lighted cross arrangement.

9. A support for light arrangements, wall panels and the like comprising a plurality of resilient corner members, each having at least two openings at right angles to one another, a plurality of telescoping side members frictionally engaged in said openings in the corner members and defining a desired support structure, a friction clamping member slidable on the telescoping members to hold them against telescoping movement in their final position, removable clip means engaging said telescoping members and a part to be supported, and an angular brace member attached to at least one of the telescoping side members and to a surface on which the support rests.

References Cited

UNITED STATES PATENTS

| | | | |
|---|---|---|---|
| 3,025,389 | 3/1962 | Esch | 240—52.2 |
| 3,275,818 | 9/1966 | Campbell | 240—10 |

NORTON ANSHER, Primary Examiner

D. J. CLEMENT, Assistant Examiner

U.S. Cl. X.R.

240—52.2; 248—206, 356